May 10, 1927.
R. W. ROST
1,628,195
METHOD OF MANUFACTURE OF COAGULUM RUBBER ARTICLES
Filed Feb. 12, 1925
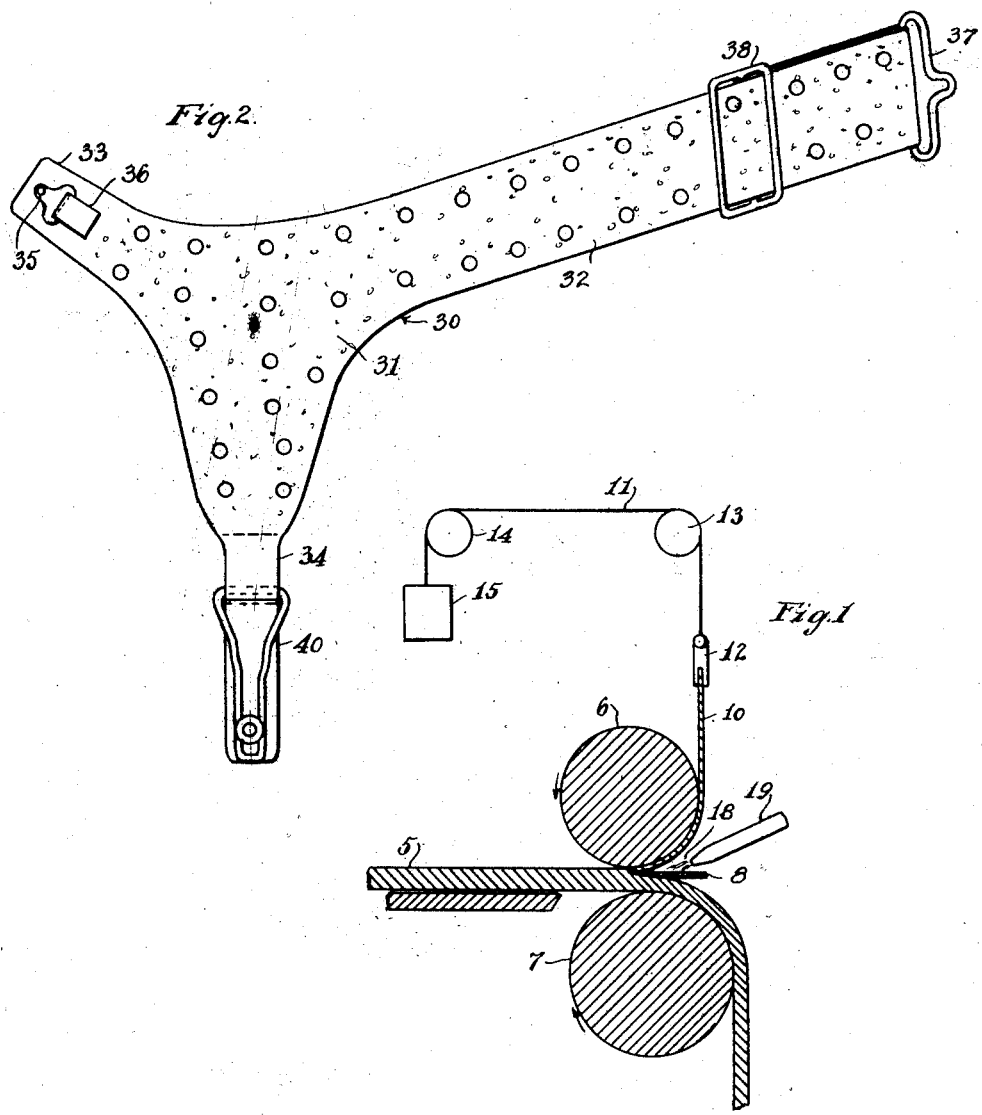
INVENTOR
Robert W. Rost.
BY
Harold O. Penney  ATTORNEY Patented May 10, 1927.

1,628,195

UNITED STATES PATENT OFFICE.

ROBERT W. ROST, OF NEWARK, NEW JERSEY, ASSIGNOR OF ONE-HALF TO ANDREW F. BIGGER, OF NEW YORK, N. Y.

METHOD OF MANUFACTURE OF COAGULUM-RUBBER ARTICLES.

Application filed February 12, 1925. Serial No. 8,858.

This invention relates to sheet rubber from which articles of wearing apparel may be made though it is noted that the invention is not limited to wearing apparel or similar uses.

One object of the invention is to provide a sheet material having many of the advantages of rubber, leather or fabric and then additional advantages.

Another object of the invention is to provide a sheet material of unvulcanized coagulum rubber which will be pervious to air and sufficiently tough and elastic to be suitable for the manufacture of garters, belts, corsets and various other and similar articles.

Another object of the invention is to provide a method whereby coagulum rubber may be produced in thin sheets suitable for manufacturing wearing apparel and for other uses.

In forming sheets of vulcanized rubber it has heretofore been the practice to mill and mix the rubber very thoroughly, and roll it out into sheets by passing it between rollers, and then to vulcanize it. Sheets thus made are not very strong and split easily, and they deteriorate very rapidly. The lasting qualities of unvulcanized rubber coagulum made by coagulating the rubber latex are well known; and similar attempts have long been made to form sheets of this rubber by similar milling processes, but entirely without success. The principal object of the present invention is to form thin sheets of this rubber suitable for making wearing apparel and for other purposes; and this and other objects have been very successfully accomplished as hereinafter explained.

Other objects of the invention are to improve generally the simplicity and efficiency of material for such articles and their manufacture and to provide materials and articles of this kind which will be durable, economical to manufacture and which will not deteriorate.

Still other objects of the invention will appear as the description proceeds; and while herein details of the invention are described, the invention is not limited to these since many and various changes may be made without departing from the scope of the invention as claimed.

The inventive features for the accomplishment of these and other objects are shown herein in connection with my improved material, its method of manufacture and an improved article of apparel made of this material.

Briefly stated, the material comprises a thin sheet of slightly formanious coagulum rubber having cut surfaces substantially throughout and free of crust; the method comprises splitting a cast slab of coagulum rubber to form sheets of the desired thickness, and cutting said sheets to form blanks for articles; and the one finished article here shown as an example is a garter comprising a one-piece thin coagulum rubber body portion including a pad and a band, the means for hooking the band around the leg and the grip for engaging the sock being separately secured to the body portion.

In the accompanying drawing,

Fig. 1 is a sectional view showing the operation, and

Fig. 2 is an outer face view of a garter made of the sheet material.

The new sheet material is made by feeding a cast slab 5 of unvulcanized coagulum rubber or coagulum between the rolls 6 and 7 of a leather splitting machine, thereby to form a line of compression in the rubber between the rolls at which the rubber is guided. A longitudinally reciprocating or continuously moving knife 8 just forward of and parallel to said line splits the slab, as it is fed, to form layers of sheets 10 of the desired thickness. A cord 11, secured by grippers 12 to the uppermost sheet and passed over pulleys 13 and 14 and weighted by a weight 15 separates and guides the sheets as they split up in a separate direction from the slab whereby water 18 from a sprinkler 19 may be applied to the active edge of the knife while cutting, thereby to facilitate the cutting.

This operation is continued in the same manner to form additional sheets until the desired number of sheets are made or all of the slab is used up. The outer sheets, with the crust on, may be discarded, the inner layers or sheets being free of crust, tough, elastic and also foraminous and substantially pervious to air; and having all cut surfaces. They are suitable for coloring or dyeing by penetration of the coloring matter into the pores of the sheet. The sheets may be cut or stamped out and, if desired, perforated to form blanks for articles of wearing apparel or for other purposes.

The sheets may be cut any thickness desired. Sheets 1/8 of an inch thick or thicker may be provided if desired. Sheets about 1/32 or 1/16 of an inch have been found very useful, but they may be cut 1/64 of an inch or thinner if desired.

The finished material of this method thus comprises a thin sheet of slightly foraminous, tough, elastic unvulcanized coagulum rubber slightly pervious to air and having cut surfaces substantially throughout and substantially proof against oxidation or other deterioration when worn or exposed to the atmosphere. It is absorbent for dyes or coloring solutions; and though it is not thought that the dyes enter into chemical combination, the colors are fast. While the material is suitable for making a vast number of different articles of wearing apparel and articles for other purposes too numerous to catalogue here, I show by way of example only one such article.

This article is a man's garter (Fig. 2) comprising a one-piece perforated body portion of the thin crust-free coagulum about 1/32 of an inch thick, though the invention is in no way limited to this thickness. This body portion includes a triangular pad 31, a band 32 extended integrally from one upper corner of the pad and upper and lower tabs 33 and 34 extending integrally respectively from the other upper corner and the lower corner of the pad. A stud 35 attached to said upper tab by means of a small strip 36 of the coagulum cemented to the tab with benzine, receives an eye-clasp 37 on the band for securing said band around the leg. While I show the usual slide-buckle 38, this is not really necessary for adjustment, as the band is very elastic and is practically proof against deterioration. Said lower tab is passed through a grip 40 and folded upon itself and cemented with benzine for securing the grip in place.

The garter is worn in the ordinary way and will last for many years as the coagulum is practically free from deterioration.

I claim as my invention:

1. Material for making articles of wearing apparel; said material comprising a thin sheet of unvulcanized, dyed, slightly foraminous, coagulum rubber, slightly pervious to air and having cut surfaces substantially throughout.

2. Material comprising a thin sheet of unvulcanized foraminous coagulum rubber free of crust.

3. Material comprising a sheet of unmilled unvulcanized rubber coagulum having cut surfaces.

4. Material comprising a thin sheet of unvulcanized foraminous coagulum rubber having all cut surfaces.

5. Material comprising a sheet of unvulcanized foraminous coagulum rubber free of crust and impregnated with coloring matter.

6. The method which consists in splitting from a slab of unvulcanized coagulum rubber sheets having crust thereon for discard of the sheets, and splitting the remainder of the slab into sheets of desired thickness and free from crust for forming articles thereof.

7. The method which consists in splitting from a slab of unvulcanized coagulum rubber sheets having crust thereon for discard of the sheets, splitting the remainder of the slab into sheets of desired thickness and free from crust, and perforating the last mentioned sheets for forming articles thereof.

8. The method which consists in splitting from a slab of unvulcanized foraminous coagulum rubber sheets having crust thereon for discard of the sheets, splitting the remainder of the slab into sheets of desired thickness and free from crust, and impregnating the last mentioned sheets with coloring matter for forming articles thereof.

9. The method which consists in compressing a slab of unvulcanized coagulum rubber for forming a line of compression in the rubber, splitting from the slab at said line of compression sheets having crust thereon for discard of the sheets, and splitting the remainder of the slab while under said compression into sheets of desired thickness and free from crust for forming articles thereof.

10. The method which consists in compressing a slab of unvulcanized foraminous coagulum rubber for forming a line of compression in the rubber, splitting from the slab at said line of compression sheets having crust thereon for discard of the sheets, splitting the remainder of the slab while under said compression into sheets of desired thickness and free from crust, impregnating the last mentioned sheets with coloring matter, and perforating the sheets for forming articles thereof.

11. The method which consists in compressing a slab of unvulcanized coagulum rubber between rolls for forming a line of compression in the rubber, splitting from the slab by cutting means applied at said line of compression sheets having crust thereon for discard of the sheets, splitting by said means the remainder of said slab while under said compression into sheets of desired thickness and free from crust for forming articles thereof, and during splitting operation by said means applying water to the slab at said line of compression for facilitating the splitting of the slab by said means.

Signed at New York, in the county of New York and State of New York, this 11th day of February, A. D. 1925.

ROBERT W. ROST.